US012558891B2

(12) United States Patent
Gibson

(10) Patent No.: US 12,558,891 B2
(45) Date of Patent: Feb. 24, 2026

(54) FLUID EJECTION HEAD HAVING FLUID VISCOSITY COMPENSATION

(71) Applicant: Brady Worldwide, Inc., Milwaukee, WI (US)

(72) Inventor: Bruce D. Gibson, Lexington, KY (US)

(73) Assignee: BRADY WORLDWIDE, INC., Milwaukee, WI (US)

( * ) Notice: Subject to any disclaimer, the term of this patent is extended or adjusted under 35 U.S.C. 154(b) by 149 days.

(21) Appl. No.: 18/409,877

(22) Filed: Jan. 11, 2024

(65) Prior Publication Data

US 2025/0229527 A1 Jul. 17, 2025

(51) Int. Cl.
*B41J 2/14* (2006.01)
*B41J 2/175* (2006.01)

(52) U.S. Cl.
CPC ......... *B41J 2/1404* (2013.01); *B41J 2/14145* (2013.01); *B41J 2/14201* (2013.01); *B41J 2/17503* (2013.01); *B41J 2/17563* (2013.01); *B41J 2002/14306* (2013.01); *B41J 2002/14403* (2013.01); *B41J 2002/14419* (2013.01)

(58) Field of Classification Search
CPC .. B41J 2/1404; B41J 2/14145; B41J 2/14201; B41J 2/17503; B41J 2/17563; B41J 2002/14306; B41J 2002/14403; B41J 2002/14419
See application file for complete search history.

(56) References Cited

U.S. PATENT DOCUMENTS

| | | | | |
|---|---|---|---|---|
| 5,912,685 | A | 6/1999 | Raman | |
| 6,247,798 | B1 | 6/2001 | Cleland et al. | |
| 6,652,079 | B2 | 11/2003 | Tsuchii et al. | |
| 7,431,434 | B2 | 10/2008 | Agarwal et al. | |
| 8,960,886 | B2 | 2/2015 | Lambright et al. | |
| 2005/0190235 | A1 * | 9/2005 | Raman .................. | B41J 2/1404 347/54 |

* cited by examiner

*Primary Examiner* — Lisa Solomon
(74) *Attorney, Agent, or Firm* — Brianna Schonenberg

(57) ABSTRACT

A fluid ejection head that includes a semiconductor substrate containing a plurality of fluid ejectors thereon and a fluid supply via etched therethrough. A flow feature layer is attached to the semiconductor substrate. The flow feature layer has a plurality of fluid channels and fluid chambers for the plurality of fluid ejectors, wherein the fluid channels are configured to provide fluid from the fluid supply via through the fluid channels to the fluid chambers for ejection of fluid through fluid nozzles associated with the fluid chambers. The fluid channels further include inlet channels and expansion channels that are configured to compensate for fluid viscosity variations. A nozzle plate containing the fluid nozzles is attached to the flow feature layer.

16 Claims, 7 Drawing Sheets

FLUID EJECTION HEAD HAVING FLUID VISCOSITY COMPENSATION

TECHNICAL FIELD

The disclosure relates to a fluid ejection head that reduces the effect of viscosity variations on fluid refill times thereby improving the firing frequency of the fluid ejection head.

BACKGROUND AND SUMMARY

It is desirable to operate a fluid ejection cartridge at a consistent rate regardless of the viscosity of the fluid being ejected. Unfortunately, the jetting frequency of the traditional fluid ejection head tends to be inversely proportional to the viscosity of the fluid being ejected.

In some applications different fluids are used in fluid cartridges for a variety of printing or fluid dispensing applications. The user is interested in achieving consistent fluid ejection at a consistent speed. However, the fluid refill time for a fluid chamber of a traditional fluid ejection head is highly dependent on the viscosity of the fluid being ejected. An ejection head for a low viscosity fluid refills faster than for a high viscosity fluid. The increased speed achieved with a low viscosity fluid reduces fluid damping, causing the ejection head to become less stable. At a high viscosity, the fluid ejection speed is limited, reducing throughput. What is desired is a fluid ejection head design that will mitigate the effects of fluid viscosity changes and will function closer to the targeted operating point.

In view of the foregoing, an embodiment of the disclosure provides a fluid ejection head that includes a semiconductor substrate containing a plurality of fluid ejectors thereon and a fluid supply via etched therethrough. A flow feature layer is attached to the semiconductor substrate. The flow feature layer has a plurality of fluid channels and fluid chambers for the plurality of fluid ejectors, wherein the fluid channels are configured to provide fluid from the fluid supply via through the fluid channels to the fluid chambers for ejection of fluid through fluid nozzles associated with the fluid chambers. The fluid channels include inlet channels and expansion channels that are configured to compensate for fluid viscosity variations. A nozzle plate containing the fluid nozzles is attached to the flow feature layer.

In another embodiment, the disclosure provides a method for reducing the slope of fluid refill time versus fluid viscosity for a fluid ejection head. The method includes providing a semiconductor substrate containing a plurality of fluid ejectors thereon and a fluid supply via etched therethrough. A flow feature layer is attached to the semiconductor substrate, wherein the flow feature layer has a plurality of fluid channels and fluid chambers for the plurality of fluid ejectors. The fluid channels are configured to provide fluid from the fluid supply via through the fluid channels to the fluid chambers for ejection of fluid through fluid nozzles associated with the fluid chambers. Inlet channels and expansion channels are provided and are configured to compensate for fluid viscosity variations are formed between each of the fluid channels and fluid chambers of the flow feature layer. A nozzle plate is attached to the flow feature layer. Fluid is fed from a fluid cartridge to the fluid ejection head ejected from the fluid ejection head.

In another embodiment, there is provide a fluid ejection device for ejecting a fluid having a viscosity ranging from about 0.5 to about 3.5 millipascal second at 40° C. The fluid ejection device has a fluid ejection head attached to a fluid supply cartridge containing the fluid. The fluid ejection head includes a semiconductor substrate containing a plurality of fluid ejectors thereon and a fluid supply via etched therethrough. A flow feature layer is attached to the semiconductor substrate, wherein the flow feature layer contains a plurality of fluid channels and fluid chambers for the plurality of fluid ejectors. The fluid channels are configured to provide the fluid from the fluid supply via through the fluid channels to the fluid chambers for ejection of the fluid through fluid nozzles associated with the fluid chambers. The fluid channels include inlet channels and expansion channels that are configured to compensate for fluid viscosity variations. A nozzle plate containing the fluid nozzles is attached to the flow feature layer. The expansion channels have an expansion channel width ($W_E$) to inlet channel width ($W_I$) ratio ($W_E/W_I$) ranging from about 3 to about 4.

In some embodiments, the expansion channels are disposed between each of the inlet channels and associated fluid chambers.

In some embodiments, the expansion channels having an expansion channel width ($W_E$) to inlet channel width ($W_I$) ratio ($W_E/W_I$) ranging from about 3 to about 4. In other embodiments, the expansion channels having an expansion channel length ($L_E$)=(($W_E/W_I$)−1)/2*$W_I$*1/tan(30), wherein $L_E/W_I$=(($W_E/W_I$)−1)/(2*1/tan(30)). In still other embodiments, $L_E/W_I$ ranges from about 1.5 to about 4.0. In some embodiments, $W_E/W_I$ is greater than 1.5 and wherein $L_E/W_I$ is greater than 1.5.

In some embodiments, each of the fluid channels also comprises a filter element.

In some embodiments, the inlet channels and expansion channels are configured to reduce a slope of fluid refill time versus fluid viscosity for fluid viscosities ranging from about 0.5 to about 2.5 millipascal second at 40° C.

An advantage of the disclosed embodiments, is that a fluid ejection head may be used on a fluid supply cartridge for dispensing a variety of fluids over a relatively wide fluid viscosity range. The traditional fluid ejection head has a fluid channel resistance that has a nearly proportional relationship with fluid viscosity. If the viscosity is reduced by one half, then the refill time is also reduced by about one half. The present disclosure provides an ejector designed with a fluid channel that lessens the effects of viscosity so that if the viscosity of the fluid changes, the performance is not as greatly affected.

DETAILED DESCRIPTION

By way of background, the Reynolds number is a value used to describe the flow of a fluid in a channel. When there is a decrease in viscosity of the fluid in the channel, the flow rate naturally increases which increases the Reynolds number. If a fluid ejection head could be designed such that the effective width of a fluid channel that provides fluid to a fluid chamber changes as a function of Reynolds number, then a negative feedback control system would have to be provided to regulate the flow of fluid in the fluid channel.

Figure 1:
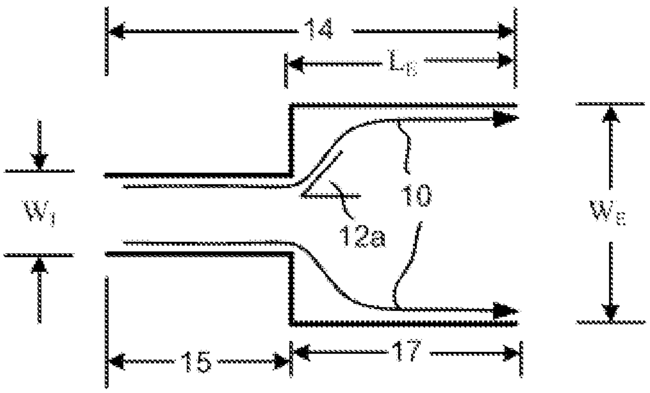
FIGS. 1 and 2 are schematic views, not to scale, of the effects of inlet channels and expansion channels on fluid flow rates in the presence of high and low viscosity fluids.
Figure 2:
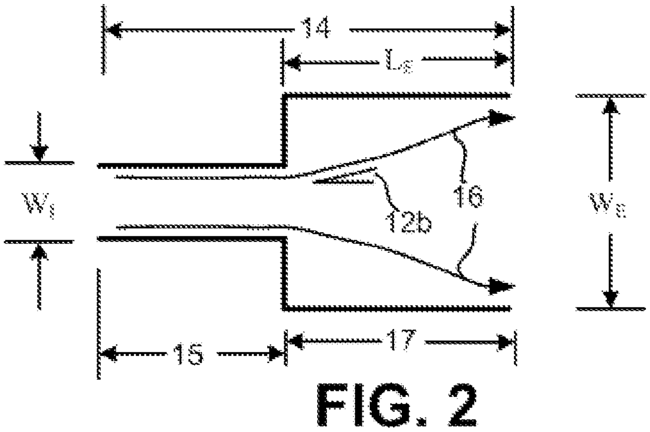

In order to avoid the need to provide a feedback system to regulate the flow of fluid in the fluid channel that provides fluid to the fluid chamber, a fluid channel that includes an inlet channel and an expansion channel is used to regulate the flow of fluid to the fluid chamber. Accordingly, it is believed that a properly designed fluid channel will act as a variable resistance that is dependent on the Reynolds number of the inlet channel. FIG. 1 illustrates the flow behavior of a fluid 10 in a fluid channel 14 that includes an expansion channel 17 having a length $L_E$ from an inlet channel 15 at a low Reynolds number (Re=1). FIG. 2 illustrates the flow behavior of a fluid 16 in a fluid channel 14 having an inlet channel 15 at a higher Reynolds number (Re=10).

As illustrated in FIG. 2, the flowlines 16 of fluid follow a reduced path width at higher flow rate compared to the flowlines 10 of fluid at a lower flow rate (FIG. 1). The path width shown by flowlines 10 and 16 defines the "expansion angle" 12 of the fluid. A higher fluid flow rate results in a more resistive fluid channel 14 at lower viscosities and a lower expansion angle 12*b*. At higher viscosities, the fluid flow rate is lower resulting in a higher expansion angle 12*a*. By making the expansion channel of sufficient width and length to accommodate the range of expected flow profiles of a given viscosity range, significant flow resistance regulation can be achieved without having to provide a negative feedback control system.

Figure 3:
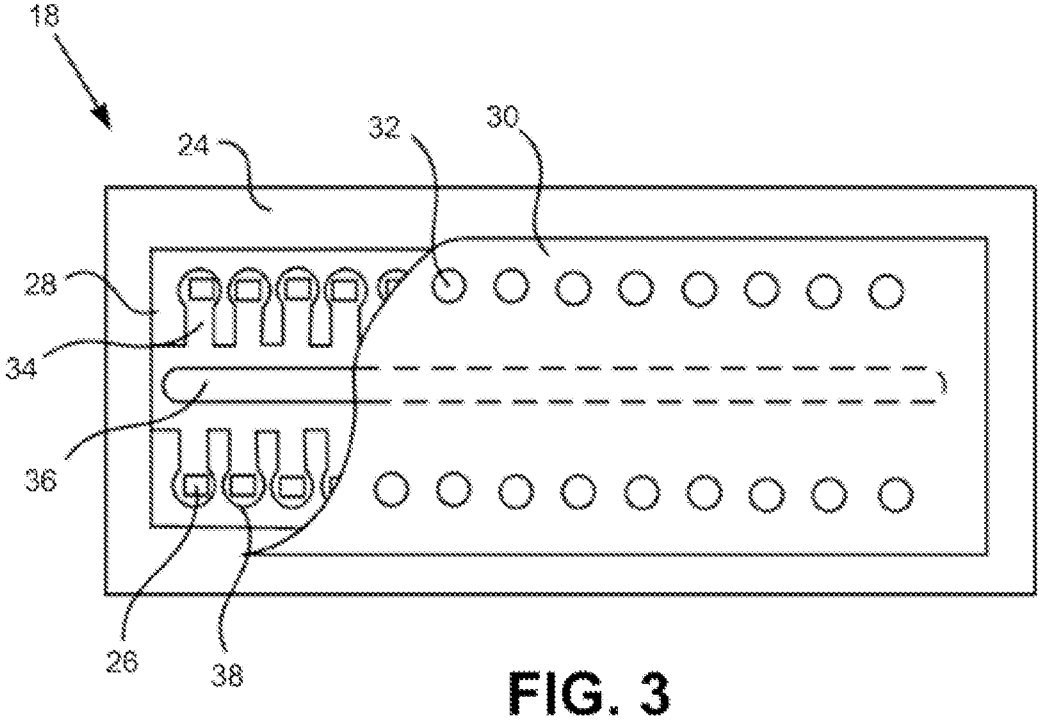
FIG. 3 is a plan view, not to scale, of an ejection head according to an embodiment of the disclosure.
Figure 4:
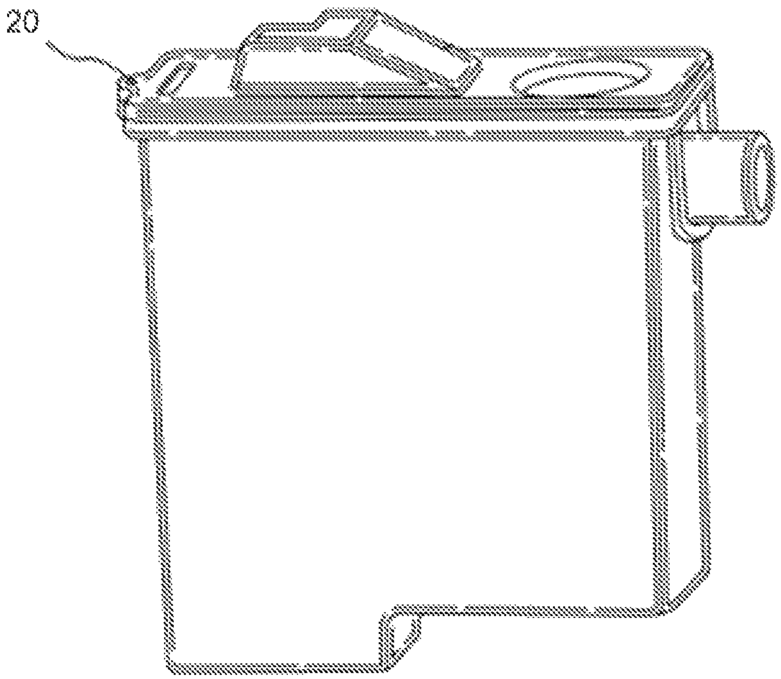
FIG. 4 is a perspective view of a fluid cartridge containing the ejection head of FIG. 3.
Figure 5:
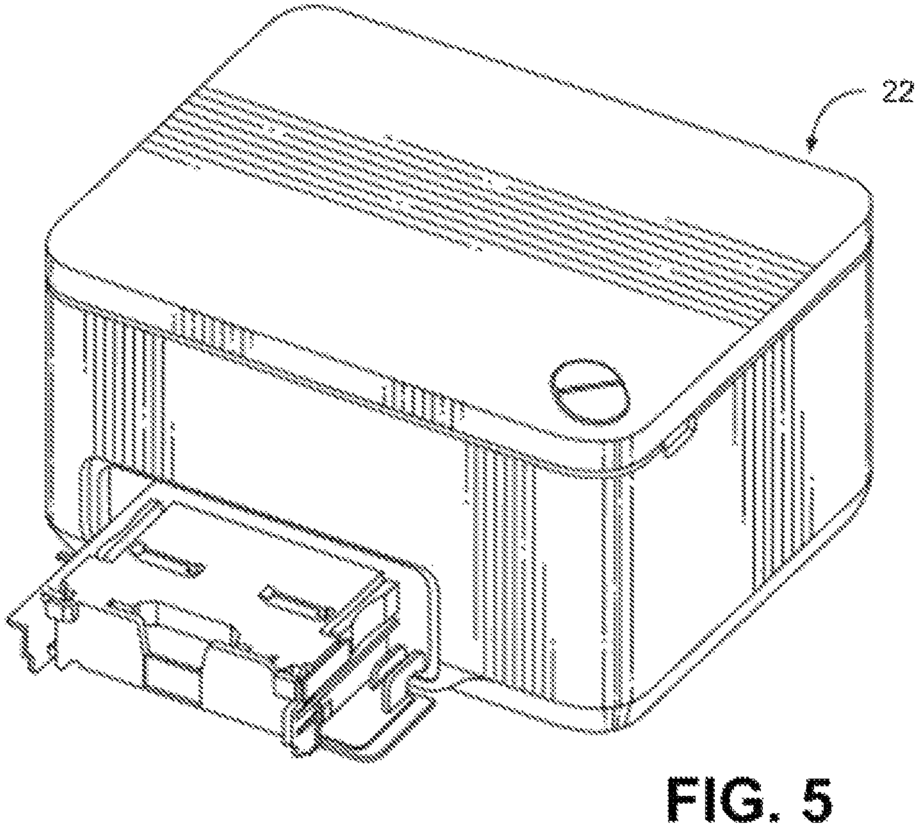
FIG. 5 is a perspective view, not to scale, of a fluid ejection device according to the disclosure.

The foregoing considerations may be applied to a design for a fluid ejection head 18 (FIG. 3) attached to a fluid cartridge 20 (FIG. 4) for a fluid ejection device 20 (FIG. 5) that may be used to eject a variety of fluids having different fluid viscosities. The fluid ejection head 18 contains a semiconductor substrate 24, having a plurality of fluid ejectors 26 formed thereon, a flow feature layer 28 attached to the semiconductor substrate 24, and a nozzle plate 30 containing fluid nozzles 32 therein attached to the flow feature layer 28. The flow feature layer 28 includes fluid channels 34 leading from a fluid supply via 36 etched through the semiconductor substrate 24 to provide a flow of fluid through the fluid channels 34 to a fluid chamber 38 containing the fluid ejectors 26. The flow feature layer 28 may have a thickness ranging from about 5 to about 50 microns. The semiconductor substrate 24 is preferably a silicon semiconductor substrate containing the plurality of fluid ejectors 26 formed thereon. The fluid ejectors 26 may be selected from piezoelectric devices or heater resistors formed on the semiconductor substrate 24. Fluid supplied through the fluid supply via 36 in the semiconductor substrate 24 flows through the fluid channels 34 to a fluid chambers 38 formed in the flow feature layer 28 where the fluid is caused to be ejected through fluid nozzles 32 in the nozzle plate 30 when the fluid ejectors 26 are activated. The nozzle plate 30 may have a thickness ranging from about 5 to about 50 microns.

Figure 6:
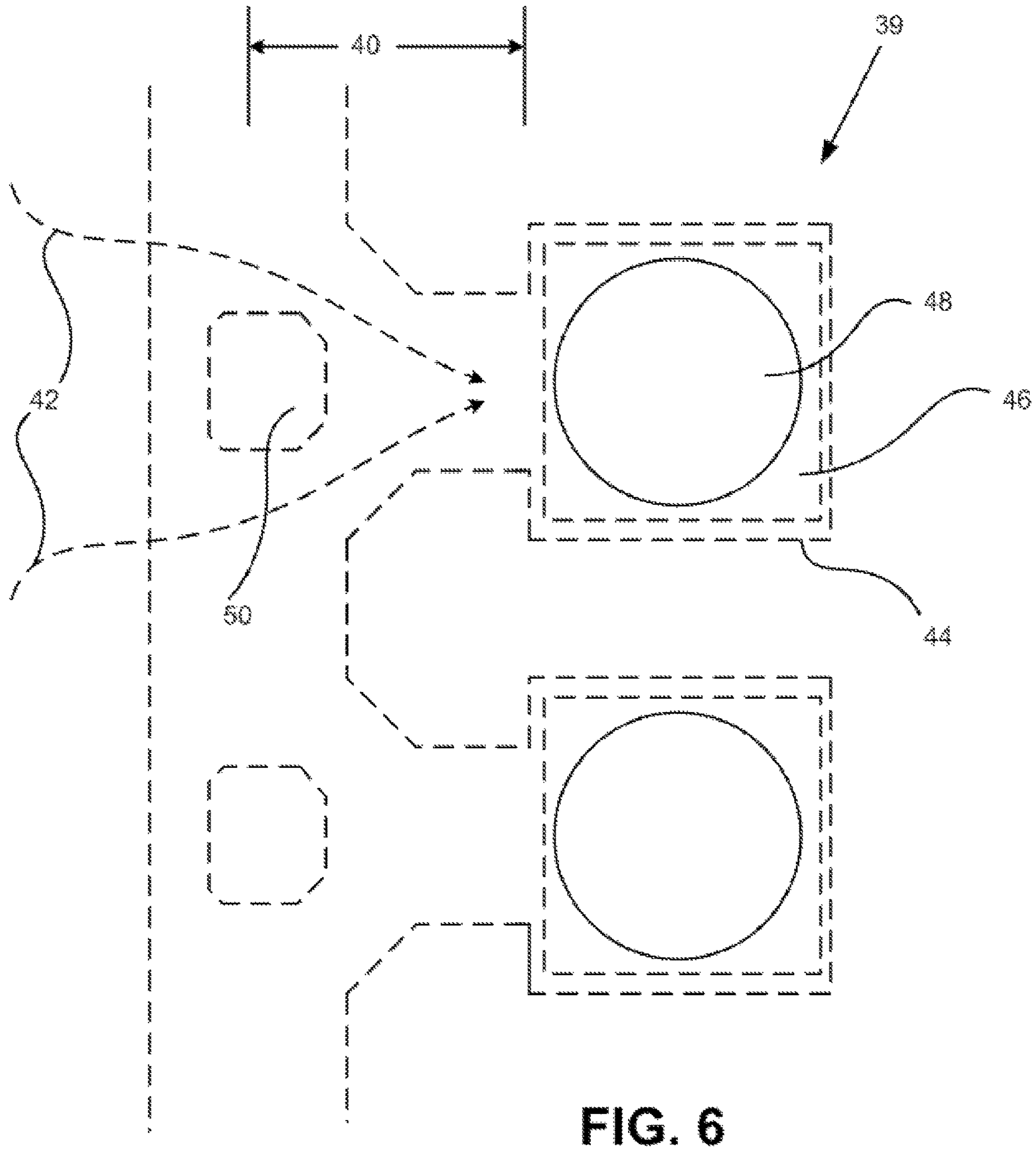
FIG. 6 Prior Art
FIG. 6 is a partial plan view, not to scale, of a prior art ejection head.

FIG. 6 illustrates a top-plan view of a portion of a prior art ejection head 39 containing a flow feature layer having a fluid channel 40 for providing fluid 42 to a fluid chamber 44 containing a fluid ejector 46 for expelling the fluid 42 through a nozzle 48. Filter elements 50 may be provided to prevent debris from entering and blocking the fluid channel 40. Simulated fluid refill times at fluid viscosities ranging from 0.5 millipascal second 2.5 millipascals second at 40° C. are illustrated as line 52 in FIG. 7 for the prior art ejection head 39.

Figure 7:
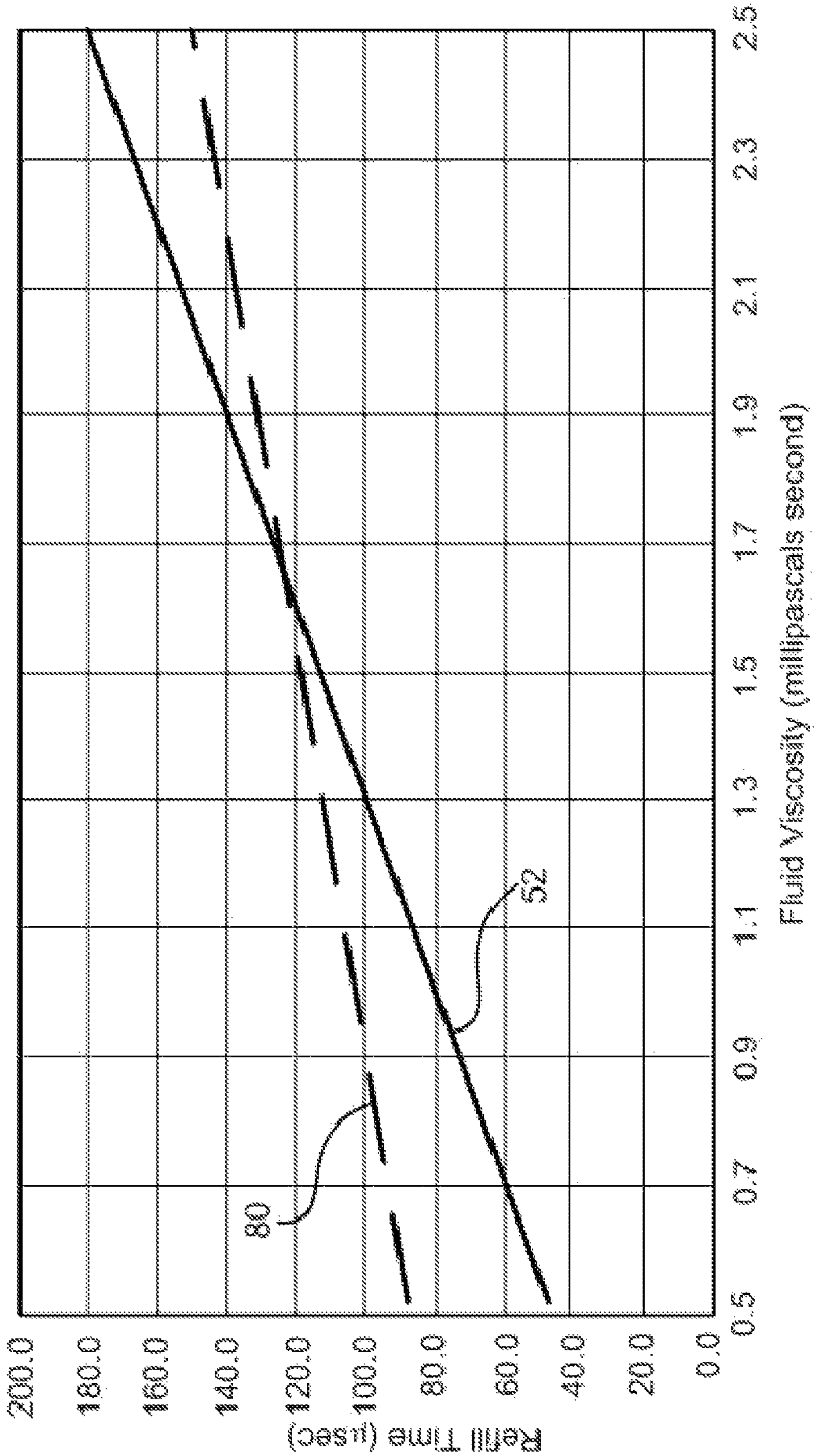
FIG. 7 is a graphical representation of refill time versus fluid viscosity for a prior art ejection head and an ejection head according to an embodiment of the disclosure.
Figure 8:
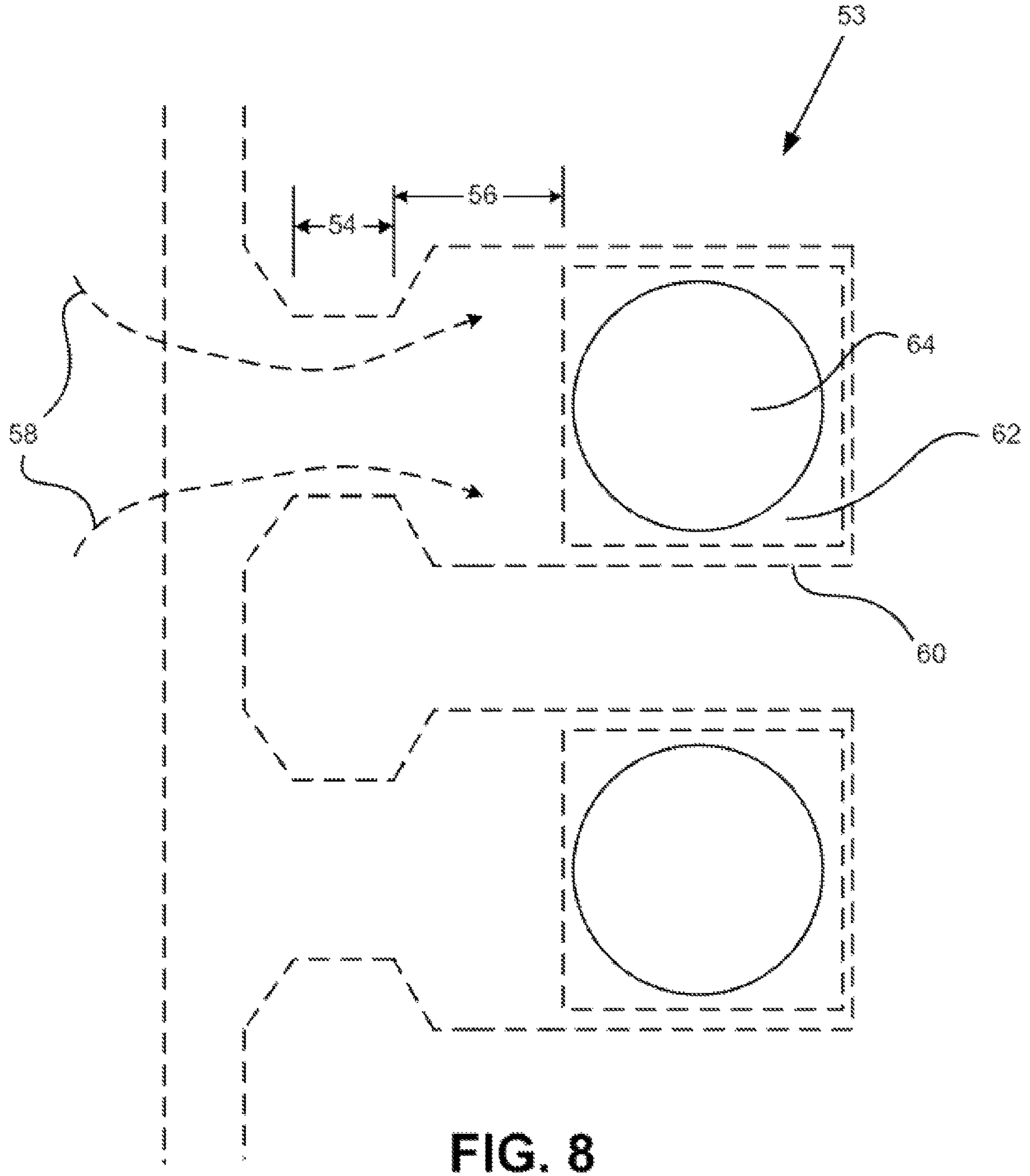
FIG. 8 is a partial plan view, not to scale, of an ejection head according to a first embodiment of the disclosure.
Figure 9:
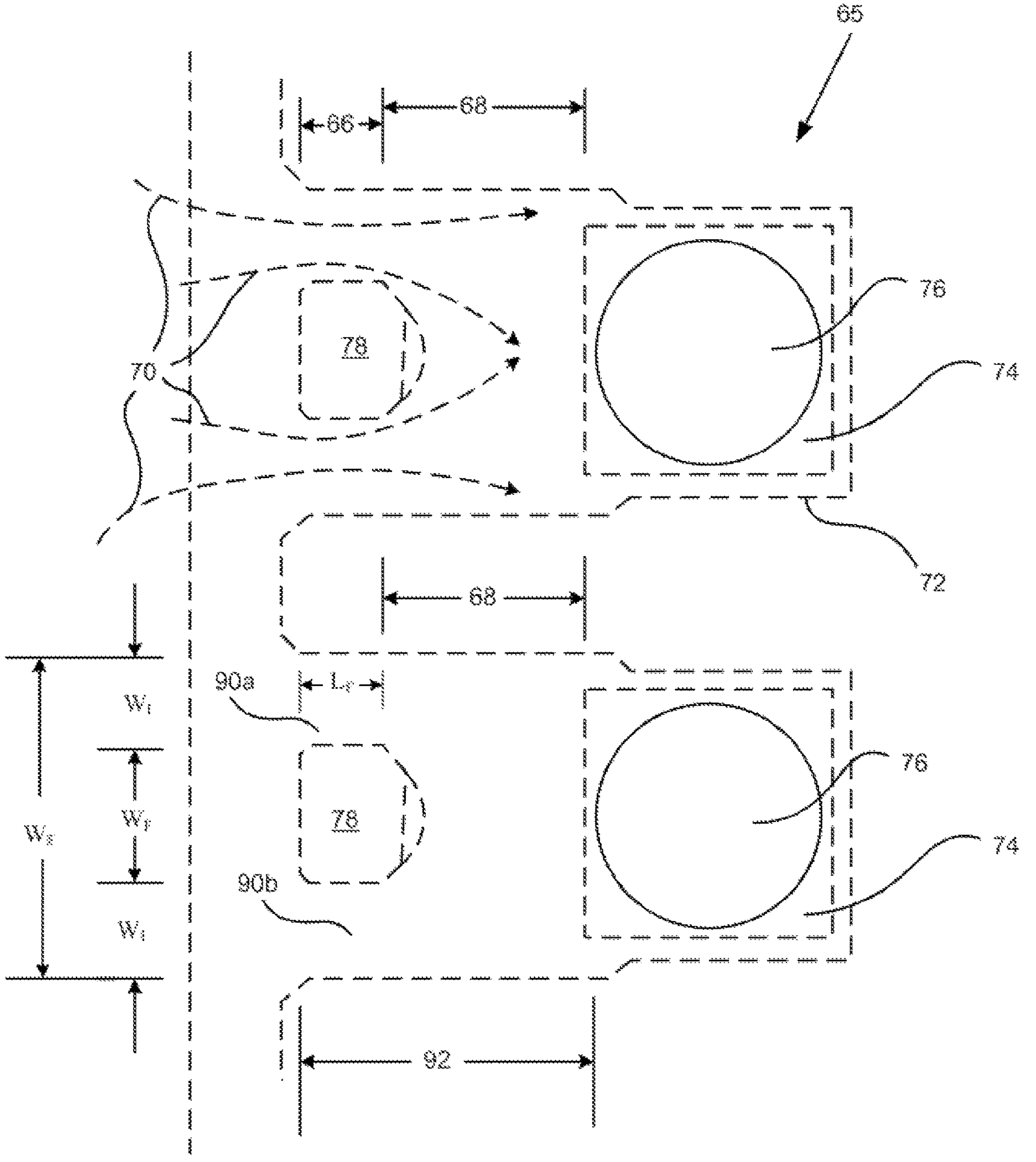
FIG. 9 is a partial plan view, not to scale, of an ejection head according to a second embodiment of the disclosure.

FIGS. 8 and 9 illustrate ejection heads according to the disclosure containing an expansion channel to improve the frequency response for refill times when the viscosity of the fluid changes. FIG. 8 illustrates a top-plan view of a portion of an ejection head 53 containing a flow feature layer having a fluid channel that includes an inlet channel 54 and an expansion channel 56 for providing fluid 58 to a fluid chamber 60 containing a fluid ejector 62 for expelling the fluid 58 through a fluid nozzle 64. FIG. 9 illustrates a top plan view of a portion of an ejection head 65 according to another embodiment of the disclosure. Like FIG. 8, the ejection head 65 of FIG. 9 has a flow feature layer having a fluid channel that includes an inlet channel 66 and an expansion channel 68 for providing fluid 70 to a fluid chamber 72 containing a fluid ejector 74 for expelling the fluid 70 through a fluid nozzle 76. The ejection head also contains a filter element 78 to prevent debris from interfering with the flow of fluid 70 to the fluid chamber 72. The simulated fluid refill times at fluid viscosities ranging from 0.5 millipascal second 2.5 millipascals second at 40° C. are illustrated as line 80 in FIG. 7 for the fluid ejection heads 53 and 65. At a fluid viscosity of 1.7 millipascal second the refill times are the same for the prior art ejection head 39 and the ejection heads 53 and 65 having expansion channels 56 and 68, respectively. In viscosity ranges above and below 1.7 millipascal second, the ejection heads 53 and 65 containing expansion channels 56 and 68 respectively have a much tighter control of frequency response as compared to the prior art ejection head 39, i.e., the slope of line 80 is about one half the slope of line 52. FIG. 7 illustrates that over the viscosity range of 0.5 to 2.5 millipascal second, the ejection heads 53 and 65 containing the expansion channels 56 and 68 may be effective to reduce the sensitivity of fluid refill times to viscosity changes by about one half.

Referring again to FIGS. 1 and 2, the following equation may be used to approximate a relationship between the Reynolds Number (Re) to expansion angle 12 for a ratio of expansion channel width ($W_E$) to inlet channel width ($W_I$) of 3:

$$\text{Expansion Angle} = -7.1 * \text{Ln}(\text{Re}) + 30.$$

Figure 10:
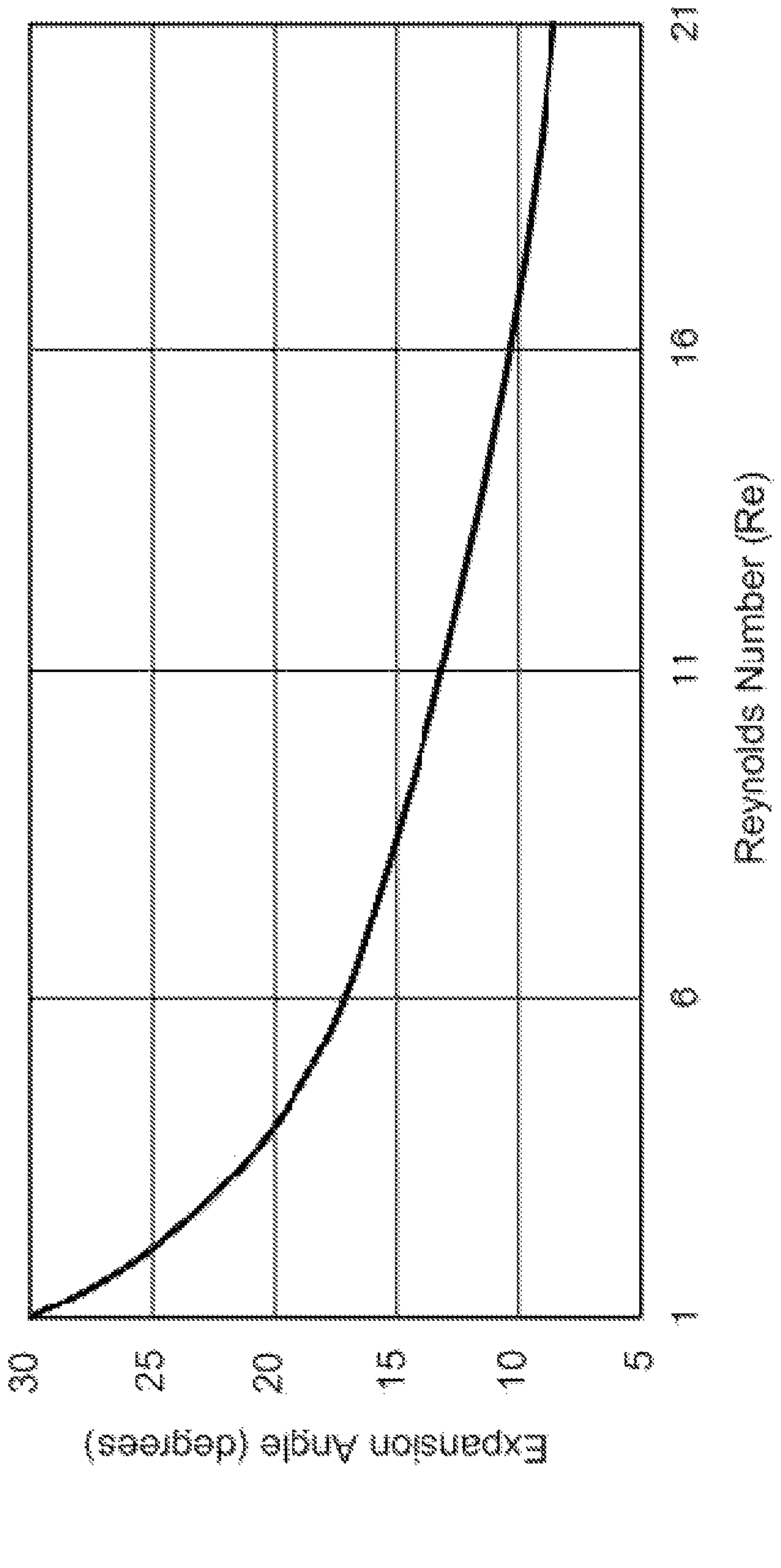
FIG. 10 is a graphical representation of the relationship between an expansion angle of fluid and the Reynolds number of the fluid.

A plot of the relationship of Expansion Angle to Reynolds Number is illustrated in FIG. 10. At a high fluid viscosity the width ($W_E$) of the expansion channel must be sufficient to allow for the fluid flow expansion necessary to reduce flow resistance. At a low fluid viscosity the length $L_E$ of the expansion channel must be sufficient to provide adequate flow resistance.

Since the Reynolds number decreases as the fluid flow expands in the expansion channel, there is a practical limit to the expansion channel length $L_E$. Also, if the expansion channel is much wider than the fluid ejector 62 and 74 there is the possibility that air can become trapped in the fluid chambers 60 and 72 causing poor performance. The foregoing considerations provide guidance as to the width and length ranges for the expansion channel. For a wide range of viscosity control, the ratio of the expansion channel width to inlet channel width ($W_E/W_I$) should be about 3 to about 4. Lower ratios provide less regulation of high viscosity fluids since the flow expansion is limited. Ratios higher than 5 may be less practical as the additional expansion channel width will not significantly reduce the flow resistance for the higher viscosity fluids.

The $W_E/W_I$ ratio may be used to define the expansion channel length $L_E$. For example, if designing for a maximum expansion angle of 12 of 30 degrees, the expansion channel length $L_E$ can be calculated as follows: $L_E=((W_E/W_I)-1)/2*(W_I)*1/\tan(30)$. Accordingly, the expansion channel length to inlet width ratio is determined as follows: $L_E/W_I=((W_E/W_I)-1)/(2*\tan(30))$.

The following table shows the calculated expansion channel length to inlet channel width ratios as a function of the ratios of expansion channel width to inlet channel width for the example of a maximum expansion angle of 30 degrees.

TABLE

| $W_E/W_I$ | $L_E/W_I$ |
|---|---|
| 3 | 1.73 |
| 4 | 2.60 |
| 5 | 3.46 |

The width of the expansion channel can be modified as needed for a particular application. For example, if high viscosity fluids are not used, then the width of the expansion channel can be reduced while maintaining the expansion channel length. For typically applications, the following ratios may be used as a general rule:

$$W_E/W_I > 1.5 \text{ and}$$

$$L_E/W_I > 1.5.$$

Referring again to FIG. 9, the following non-limiting example may be used to provide ratios within the ranges above. An ejection head 65 (FIG. 9) contains filter elements 78 that provide two inlet channels 90*a* and 90*b* each having an inlet channel width $W_I$ of 15.2 microns. The expansion channel 68 has an expansion channel width $W_E$ of 53.4 microns. The length 92 of the inlet channel to the fluid nozzle 76 is 35 microns. The thickness of the flow feature layer is 30 microns. The nozzle diameter is 36 microns and the nozzle plate thickness is 30 microns. The fluid ejector 74 has a width of 40 microns and a length of 41 microns. The filter elements 78 are 23 microns wide ($W_F$) and 17.5 microns long ($L_F$). Using the forgoing parameters, the ratios are calculated as follows:

$$W_E/W_1 = 53.4/(15.2) = 3.51 \text{ and}$$

$$L_E/W_I = 35/15.2 = 2.3.$$

It is believed that fluid ejection heads designed according to the embodiments described herein may be suitable for a wider variety of fluids so that the viscosity of the fluids will have less of an effect on the fluid refill times than with prior art ejection heads. For all of the embodiments disclosed herein, the thickness of the flow feature layer is not critical to improving the fluid refill times for the ejection head.

Having described various aspects and exemplary embodiments and several advantages thereof, it will be recognized by those of ordinary skills that the disclosed embodiments is susceptible to various modifications, substitutions and revisions within the spirit and scope of the appended claims.

What is claimed is:

1. A fluid ejection head comprising: a semiconductor substrate containing a plurality of fluid ejectors thereon and a fluid supply via etched therethrough a flow feature layer attached to the semiconductor substrate, wherein the flow feature layer comprises a plurality of fluid channels and fluid chambers for the plurality of fluid ejectors, wherein the fluid channels are configured to provide fluid from the fluid supply via through the fluid channels to the fluid chambers for ejection of fluid through fluid nozzles associated with the fluid chambers, and wherein the fluid channels comprise inlet channels and expansion channels that are configured to compensate for fluid viscosity variations and a nozzle plate containing the fluid nozzles attached to the flow feature layer, wherein the expansion channels have an expansion channel width (WE) to inlet channel width (W1) ratio (WE/Wi) ranging from about 3 to about 4,and wherein the expansion channels having have an expansion channel length (LE)=((WE/Wi)−1)/2*Wi*1/tan(30), wherein LE/WI=((WE/W1)−1)/(2*1/tan(30)).

2. The fluid ejection head of claim 1, wherein the expansion channels are disposed between each of the inlet channels and associated fluid chambers.

3. The fluid ejection head of claim 1, wherein $L_E/W_I$ ranges from about 1.5 to about 4.0.

4. The fluid ejection head of claim 1, wherein $W_E/W_I$ is greater than 1.5 and wherein $L_E/W_I$ is greater than 1.5.

5. A fluid ejection device comprising a fluid cartridge having fluid to be dispensed by the fluid ejection head of claim 1.

6. A fluid ejection head comprising: a semiconductor substrate containing a plurality of fluid ejectors thereon and a fluid supply via etched therethrough; a flow feature layer attached to the semiconductor substrate, wherein the flow feature layer comprises a plurality of fluid channels and fluid chambers for the plurality of fluid ejectors, wherein the fluid channels are configured to provide fluid from the fluid supply via through the fluid channels to the fluid chambers for ejection of fluid through fluid nozzles associated with the fluid chambers, and wherein the fluid channels comprise inlet channels and expansion channels that are configured to compensate for fluid viscosity variations; and a nozzle plate containing the fluid nozzles attached to the flow feature layer, wherein each of the fluid channels also comprises a filter element.

7. A fluid ejection device comprising a fluid cartridge having fluid to be dispensed by the fluid ejection head of claim 6.

8. The fluid ejection head of claim 6, wherein the expansion channels are disposed between each of the inlet channels and associated fluid chambers.

9. A fluid ejection head comprising: a semiconductor substrate containing a plurality of fluid ejectors thereon and a fluid supply via etched therethrough; a flow feature layer attached to the semiconductor substrate, wherein the flow feature layer comprises a plurality of fluid channels and fluid chambers for the plurality of fluid ejectors, wherein the fluid channels are configured to provide fluid from the fluid supply via through the fluid channels to the fluid chambers for ejection of fluid through fluid nozzles associated with the fluid chambers, and wherein the fluid channels comprise inlet channels and expansion channels that are configured to compensate for fluid viscosity variations; and a nozzle plate containing the fluid nozzles attached to the flow feature layer, wherein the inlet channels and expansion channels are configured to reduce a slope of fluid refill time versus fluid viscosity for fluid viscosities ranging from about 0.5 to about 2.5 millipascal second at 40° C.

10. The fluid ejection head of claim 9, wherein the expansion channels are disposed between each of the inlet channels and associated fluid chambers.

11. A fluid ejection device comprising a fluid cartridge having fluid to be dispensed by the fluid ejection head of claim 9.

12. A method for reducing the slope of fluid refill time versus fluid viscosity for a fluid ejection head comprising: providing a semiconductor substrate containing a plurality of fluid ejectors thereon and a fluid supply via etched therethrough; attaching a flow feature layer to the semiconductor substrate, wherein the flow feature layer comprises a plurality of fluid channels and fluid chambers for the plurality of fluid ejectors, wherein the fluid channels are configured to provide fluid from the fluid supply via through the fluid channels to the fluid chambers for ejection of fluid through fluid nozzles associated with the fluid chambers; and forming inlet channels and expansion channels that are configured to compensate for fluid viscosity variations between the fluid supply via and each of the fluid chambers of the flow feature layer;

attaching a nozzle plate to the flow feature layer; feeding fluid from a fluid cartridge to the fluid ejection head; and ejecting fluid from the fluid ejection head, wherein the expansion channels have an expansion channel width (WE) to inlet channel width (Wi) ratio (WE/WI) ranging from about 3 to about 4, and wherein the expansion channels have an expansion channel length (LE)_((WE/WI)−1)/2*Wi*1/tan(30), wherein LE/WI=((WE/WI)−1)/(2*1/tan(30)).

13. The method of claim 12, wherein $L_E/W_I$ ranges from about 1.5 to about 4.0.

14. A method for reducing the slope of fluid refill time versus fluid viscosity for a fluid ejection head comprising: providing a semiconductor substrate containing a plurality of fluid ejectors thereon and a fluid supply via etched therethrough; attaching a flow feature layer to the semiconductor substrate, wherein the flow feature layer comprises a plurality of fluid channels and fluid chambers for the plurality of fluid ejectors, wherein the fluid channels are configured to provide fluid from the fluid supply via through the fluid channels to the fluid chambers for ejection of fluid through fluid nozzles associated with the fluid chambers; and forming inlet channels and expansion channels that are configured to compensate for fluid viscosity variations between the fluid supply via and each of the fluid chambers of the flow feature layer; attaching a nozzle plate to the flow feature layer; feeding fluid from a fluid cartridge to the fluid ejection head; and ejecting fluid from the fluid ejection head, wherein the inlet channels and expansion channels are configured to reduce a slope of fluid refill time versus fluid viscosity for fluid viscosities ranging from about 0.5 to about 2.5 millipascal second at 40° C.

15. A fluid ejection device for ejecting a fluid having a viscosity ranging from about 0.5 to about 2.5 millipascal second at 40° C., the fluid ejection device comprising: a fluid ejection head attached to a fluid supply cartridge containing the fluid, wherein the fluid ejection head comprises: a semiconductor substrate containing a plurality of fluid ejectors thereon and a fluid supply via etched therethrough; a flow feature layer attached to the semiconductor substrate, wherein the flow feature layer comprises a plurality of fluid channels and fluid chambers for the plurality of fluid ejectors, wherein the fluid channels are configured to provide the fluid from the fluid supply via through the fluid channels to the fluid chambers for ejection of the fluid through fluid nozzles associated with the fluid chambers, and wherein the fluid channels comprise inlet channels and expansion channels that are configured to compensate for fluid viscosity variations; and a nozzle plate containing the fluid nozzles attached to the flow feature layer, wherein the expansion channels have an expansion channel width (WE) to inlet channel width (Wi) ratio (WE/WI) ranging from about 3 to about 4; and wherein the expansion channels have an expansion channel length (LE)_((WE/WI)−1)/2*Wi*1/tan(30), wherein LE/WI=((WE/WI)−1)/(2*1/tan(30)).

16. A fluid ejection device for ejecting a fluid having a viscosity ranging from about 0.5 to about 2.5 millipascal second at 40° C., the fluid ejection device comprising: a fluid ejection head attached to a fluid supply cartridge containing the fluid, wherein the fluid ejection head comprises: a semiconductor substrate containing a plurality of fluid ejectors thereon and a fluid supply via etched therethrough; a flow feature layer attached to the semiconductor substrate, wherein the flow feature layer comprises a plurality of fluid channels and fluid chambers for the plurality of fluid ejectors, wherein the fluid channels are configured to provide the fluid from the fluid supply via through the fluid channels to the fluid chambers for ejection of the fluid through fluid nozzles associated with the fluid chambers, and wherein the fluid channels comprise inlet channels and expansion channels that are configured to compensate for fluid viscosity variations; and a nozzle plate containing the fluid nozzles attached to the flow feature layer, wherein the expansion channels have an expansion channel width (WE) to inlet channel width (Wi) ratio (WE/WI) ranging from about 3 to about 4; and the expansion channels have an expansion channel length (LE), wherein LE/WI ranges from about 1.5 to about 4.0.

* * * * *